US009448341B2

(12) United States Patent
Tsuji

(10) Patent No.: US 9,448,341 B2
(45) Date of Patent: Sep. 20, 2016

(54) VIEW ANGLE-RESTRICTION SHEET AND FLAT PANEL DISPLAY

(71) Applicant: KEIWA INC., Osaka (JP)

(72) Inventor: Takahiro Tsuji, Osaka (JP)

(73) Assignee: Keiwa Inc., Osaka (JP)

( * ) Notice: Subject to any disclaimer, the term of this patent is extended or adjusted under 35 U.S.C. 154(b) by 0 days.

(21) Appl. No.: 14/395,277

(22) PCT Filed: Apr. 22, 2013

(86) PCT No.: PCT/JP2013/061808

§ 371 (c)(1),
(2) Date: Oct. 17, 2014

(87) PCT Pub. No.: WO2013/161770

PCT Pub. Date: Oct. 31, 2013

(65) Prior Publication Data

US 2015/0131154 A1 May 14, 2015

(30) Foreign Application Priority Data

Apr. 23, 2012 (JP) ................................ 2012-097753
Apr. 19, 2013 (JP) ................................ 2013-088087

(51) Int. Cl.
*G02B 5/02* (2006.01)
*G09F 19/12* (2006.01)
(Continued)

(52) U.S. Cl.
CPC ............... *G02B 5/0242* (2013.01); *G02B 5/02* (2013.01); *G02B 5/0205* (2013.01);
(Continued)

(58) Field of Classification Search
CPC .... G02B 5/0236; G02B 5/02; G02B 5/0205; G02B 5/0263; G09F 19/12; G09F 19/14; G02F 1/133524; G02F 1/1335
USPC ................................................. 359/620, 625
See application file for complete search history.

(56) References Cited

U.S. PATENT DOCUMENTS

2004/0047042 A1 3/2004 Takahashi et al.
2010/0157216 A1 6/2010 Wada (Continued)

FOREIGN PATENT DOCUMENTS

CN 1474950 2/2004
CN 101821650 9/2010

(Continued)

OTHER PUBLICATIONS

English Translation of, "Optical Film, and Method for Manufacturing the Same", Yamashita Tomoyoshi (Inventor). Mitsubishi Rayon Co (Assignee). JP 2007272065 A. (Published Oct. 18, 2007).*

*Primary Examiner* — Bumsuk Won
*Assistant Examiner* — William R Alexander
(74) *Attorney, Agent, or Firm* — Norris McLaughlin & Marcus, P.A.

(57) ABSTRACT

The view angle-restricting sheet includes an optically functional layer including: a plurality of first light transmission sections that are rectangular in cross section and arranged in a multi-stripe fashion; and one or more second light transmission section(s) that is/are each arranged between adjacent first light transmission sections. The first light transmission sections contain a light diffusing agent and a resin matrix. The proportion of the surface area occupied by the first light transmission sections with respect to the surface area of the optically functional layer is no less than 5% and no greater than 40%. The ratio ($T_1/W_1$) of the thickness ($T_1$) to the width ($W_1$) of the first light transmission section is preferably no less than 4 and no greater than 40. The average distance between adjacent first light transmission sections is preferably no less than 6 μm and no greater than 400 μm.

12 Claims, 3 Drawing Sheets

(51) Int. Cl.
*G02F 1/1335* (2006.01)
*G09F 19/14* (2006.01)

(52) U.S. Cl.
CPC ......... *G02B 5/0236* (2013.01); *G02B 5/0263* (2013.01); *G02F 1/1335* (2013.01); *G02F 1/133504* (2013.01); *G02F 1/133524* (2013.01); *G09F 19/12* (2013.01); *G09F 19/14* (2013.01)

(56) References Cited

U.S. PATENT DOCUMENTS

| | | | | |
|---|---|---|---|---|
| 2010/0214506 | A1 | 8/2010 | Gaides et al. | |
| 2010/0265588 | A1 | 10/2010 | Yang et al. | |
| 2011/0024779 | A1* | 2/2011 | Nakamura | B82Y 20/00 257/98 |
| 2012/0243098 | A1* | 9/2012 | Naito | G02B 5/003 359/601 |

FOREIGN PATENT DOCUMENTS

| | | |
|---|---|---|
| JP | 2001-305312 | 10/2001 |
| JP | 2007-272065 | 10/2007 |
| JP | 2009-009112 | 1/2009 |
| JP | 2009-031746 | 2/2009 |
| JP | 2010-223996 | 10/2010 |
| KR | 2003-0004401 | 1/2003 |
| TW | 201031969 | 9/2010 |

* cited by examiner

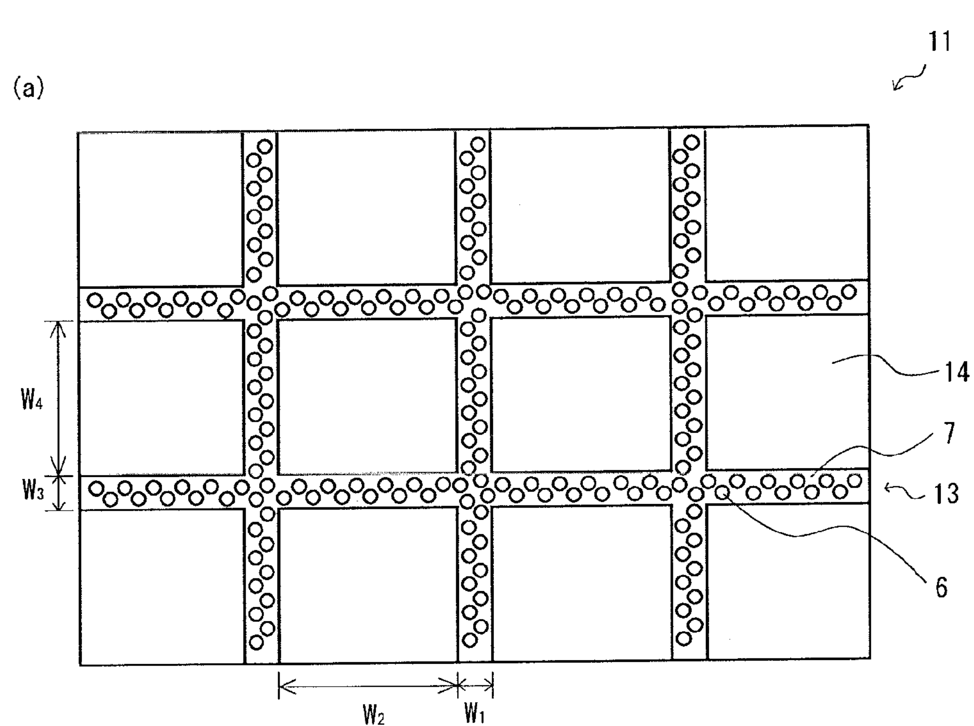
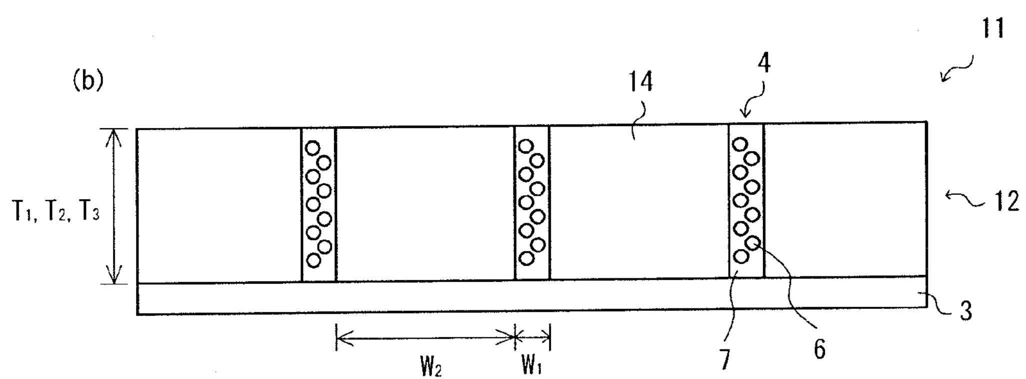
F I G. 3

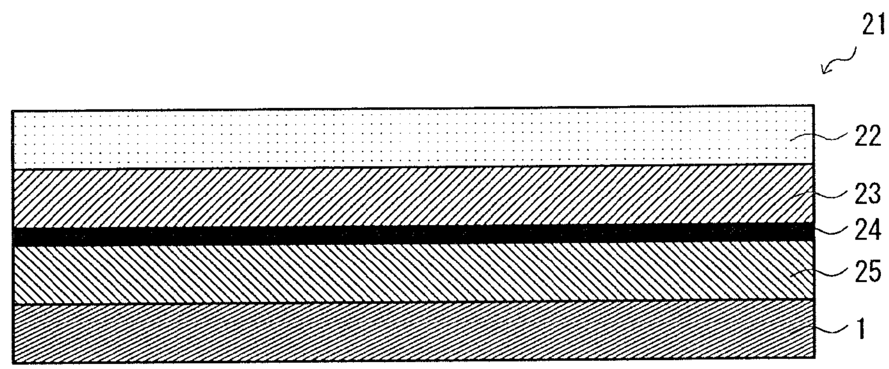
F I G. 4
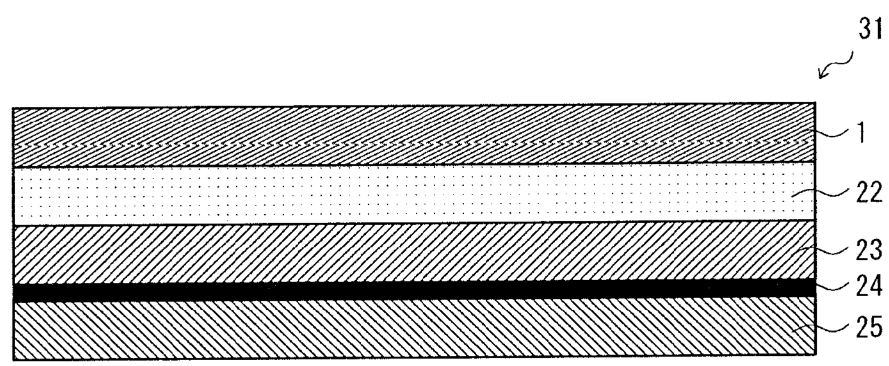
F I G. 5

VIEW ANGLE-RESTRICTION SHEET AND FLAT PANEL DISPLAY

TECHNICAL FIELD

The present invention relates to a view angle-restricting sheet and a flat panel display.

BACKGROUND OF THE INVENTION

Flat panel displays are intensively used as information display devices such as mobile phones, personal digital assistances (PDAs), personal computers and televisions.

As far as the mobile phones and the personal digital assistances are concerned, for example, the flat panel displays provide advantages that: they enable necessary information to be obtained wherever the information is desired; and the like. However, in some places, an image displayed on the mobile phones or the personal digital assistances is highly likely to be subjected to peeking by person(s) around a user, which causes an issue of privacy such as leakage of personal information.

In addition, some flat panel displays include a touchscreen in order to improve ease of operation for users, speedy operability, and the like. Such flat panel displays that include the touchscreen are employed in ATMs (automated teller machines) installed in banks, for example; however, if a security code or personal information is subjected to peeking by person(s) around a user when the user inputs the security code or personal information through the touchscreen, such information may be used for improper purposes.

In view of such problems, in these days, a view angle-restricting sheet has been proposed that can prevent peeking by person(s) around a user by restricting a view angle (see Japanese Unexamined Patent Application, Publication No. 2010-223996).

The view angle-restricting sheet (which may be referred to as "view angle-controlling optical sheet") includes a first region that yields a narrow view angle on a display screen, and a second region that yields a wide view angle on the display screen. The view angle-controlling optical sheet is characterized in that the first region is formed by alternately arranging: light transmission sections that contain an optically transparent material; and light-absorbing sections that contain a light-absorbing material. The view angle-controlling optical sheet can extract rays of light having an incident angle falling within a certain range of angle, [0]predominantly including those perpendicularly oriented, and absorb rays of light obliquely oriented on the light-absorbing section, and therefore the peeking by the person(s) around the user from the oblique direction can be prevented. However, in the view angle-controlling optical sheet, the light-absorbing sections are arranged at a constant interval, and therefore the view angle-controlling optical sheet has a disadvantage that a reduction in front face luminance is likely to be caused.

PRIOR ART DOCUMENTS

Patent Document 1: Japanese Unexamined Patent Application, Publication No. 2010-223996

SUMMARY OF THE INVENTION

The present invention was made in view of the foregoing circumstances, and an object of the present invention is to provide: a view angle-restricting sheet capable of suitably preventing leakage of personal information and the like through glimmering from an oblique direction and capable of inhibiting a reduction in front face luminance; and a flat panel display that includes the view angle-restricting sheet.

According to an aspect of the invention made for solving the aforementioned problems, a view angle-restricting sheet is provided, including an optically functional layer which includes a plurality of first light transmission sections that are rectangular in cross section and arranged in a multi-stripe fashion; and one or more second light transmission section(s) that is/are each arranged between adjacent first light transmission sections, wherein the first light transmission sections contain a light diffusing agent and a resin matrix, and a proportion of a surface area occupied by the first light transmission sections with respect to a surface area of the optically functional layer is no less than 5% and no greater than 40%.

Since the view angle-restricting sheet includes the first light transmission sections, and the second light transmission sections each arranged between adjacent first light transmission sections, and the first light transmission sections contain the light diffusing agent and the resin matrix, the rays of light having entered from the back face side in a certain oblique direction with respect to the second light transmission section are enabled to exit after being diffused, by the first light transmission sections. On the other hand, the view angle-restricting, sheet enables the rays of light having entered from the back face side substantially perpendicularly to the second light transmission section to exit substantially perpendicularly from the front face side of the second light transmission section. Therefore, the view angle-restricting sheet can serve to display a sharp image to a person seeing from the front direction (user), and can prevent the leakage of personal information and the like to a person seeing from the oblique direction by blurring the image displayed. The view angle-restricting sheet prevents the leakage of personal information and the like by diffusing, by means of the first light transmission sections, the rays of light having entered from the back face side in a certain oblique direction with respect to the second light transmission section; therefore, a reduction in front lace luminance can be inhibited. According to the view angle-restricting sheet, since the proportion of the surface area occupied by the first light transmission sections with respect to that of the optically functional layer is no less than 5% and no greater than 40%, the leakage of personal information and the like through glimmering from the oblique direction can be prevented, and a reduction of the sharpness of an image can be inhibited using the rays of light diffused by the first light transmission sections when the image is seen from the front direction.

According to the view angle-restricting sheet, the ratio $(T_1/W_1)$ of the thickness $(T_1)$ to the width $(W_1)$ of the first light transmission section is preferably no less than 4 and no greater than 40. Thus, a sharp image can be displayed to the person seeing from the front direction, and the leakage of personal information and the like through glimmering from the oblique direction can be suitably prevented.

According to the view angle-restricting sheet, an average distance between adjacent first light transmission sections arranged is preferably no less than 6 μm and no greater than 400 μm. Thus, a sharp image can be displayed to the person seeing from the front direction, and the leakage of personal information and the like through glimmering from the oblique direction can be suitably prevented.

According to the view angle-restricting sheet, the mass ratio of the light diffusing agent to the matrix is preferably no less than 0.1 and no greater than 2. Thus, the rays of light having entered the first light transmission section can be suitably diffused.

According to the view angle-restricting sheet, a refractive index ($n_1$) of the matrix is preferably greater than a refractive index ($n_2$) of the second light transmission section. Thus, the sharpness of an image displayed to the person seeing from the front direction can be improved.

According to the view angle-restricting sheet, a difference ($n_1-n_2$) between the refractive index ($n_1$) of the matrix and the refractive index ($n_2$) of the second light transmission section is preferably no less than 0.15. Thus, the sharpness of an image displayed to the person seeing from the front direction can be further improved.

According to the view angle-restricting sheet, the refractive index ($n_1$) of the matrix is preferably no less than 1.57. Thus, the sharpness of an image displayed to the person seeing from the front direction can be improved.

According to the view angle-restricting sheet, an absolute value of a difference ($|n_1-n_3|$) between the refractive index ($n_1$) of the matrix and a refractive index ($n_3$) of the light diffusing agent is preferably no less than 0.03. Thus, the rays of light having entered the first light transmission section can be suitably diffused at a boundary between the matrix and the light diffusing agent.

According to the view angle-restricting sheet, the refractive index ($n_1$) of the matrix is preferably greater than the refractive index ($n_3$) of the light diffusing agent. Thus, the rays of light having entered the first light transmission section can be suitably diffused.

According to the view angle-restricting sheet, the first light transmission section and the second light transmission section are preferably arranged without any gap. Thus, the sharpness of an image in the front direction and the degree of blurring of the image in the oblique direction may be suitably controlled.

According to the view angle-restricting sheet, the front face of the optically functional layer is preferably entirely flat. Thus, outgoing rays of light can be easily controlled. In addition, according to the view angle-restricting sheet, a constant thickness of the optically functional layer can be maintained, and ease of use and optical uniformity thereof can be improved.

According to the view angle-restricting sheet, the back face of the optically functional layer is preferably entirely flat. Thus, incident rays of light can be easily controlled. In addition, according to the view angle-restricting sheet, a constant thickness of the optically functional layer can be maintained, and ease of use and optical uniformity thereof can be improved.

The view angle-restricting sheet preferably includes a protective layer provided on one face side of the optically functional layer. Thus, the moldability, the strength, the shape stability, and the like can be improved.

According to the view angle-restricting sheet, a refractive index ($n_4$) of the protective layer preferably is equal to a refractive index ($n_2$) of the second light transmission section. Thus, a loss of the rays of light may be inhibited; leading to an improvement of the front face luminance.

According to the view angle-restricting sheet, the matrix preferably contains a pigment in a dispersion state. Thus, heat resistance, thermal dimensional stability, weather resistance, strength, an ability to prevent degradation over time, and the like of the first light transmission section can be improved. In addition, when the matrix contains a white pigment in a dispersion state, the view angle-restricting sheet enables the rays of light directed toward the first light transmission section from the second light transmission section to be reflected by the second light transmission section. As a result, the luminance in the front direction of the view angle-restricting sheet can be improved. In addition, according to the view angle-restricting sheet, when the matrix contains a black pigment in a dispersion state, the light absorptivity of the first light transmission section can be enhanced. As a result, the view angle-restricting sheet enables the rays of light having entered the first light transmission section to be absorbed to some extent, and consequently the visibility from the oblique direction to be reduced.

According to the view angle-restricting sheet, it is preferred that the optically functional layer includes one or more third light transmission section(s) that is/are provided crosswise with respect to the first light transmission section and that contain(s) a light diffusing agent and a resin matrix. Thus, the possibility of the leakage of personal information and the like to the person seeing from the oblique direction can be remarkably reduced.

The view angle-restricting sheet is preferably provided on a front face side of a display panel of a flat panel display. Thus, a sharp image can be displayed to the person seeing from the front direction, and the leakage of personal information and the like through glimmering from the oblique direction can be suitably prevented.

Moreover, according to another aspect of the invention made for solving the aforementioned problems, a flat panel display is provided, including the view angle-restricting sheet according to the aspect of the present invention.

According to the flat panel display, the rays of light having entered from the back face side of the view angle-restricting sheet in a certain oblique direction with respect to the second light transmission section are allowed to exit after being diffused by the first light transmission sections. On the other hand, the flat panel display enables the rays of light having entered from the back face side of the view angle-restricting sheet substantially perpendicularly to the second light transmission section to exit substantially perpendicularly from the front face side of the second light transmission section. Therefore, the flat panel display can display a sharp image to a person seeing from the front direction (user), and can prevent the leakage of personal information and the like to a person seeing from the oblique direction by blurring the image displayed.

It is to be noted that the terms "width" and "distance" as used herein mean an average length along a direction perpendicular to a longitudinal direction and perpendicular to a thickness direction of the sheet. Moreover, the term "thickness" means an average thickness measured in accordance with JIS K7130. The term "front face side" means the observer side of a flat panel display, and the term "back face side" means the opposite side thereof.

As explained in the foregoing, the view angle-restricting sheet and the flat panel display including the view angle-restricting sheet according to the aspects of the present invention enable the leakage of personal information and the like through glimmering from the oblique direction to be suitably prevented and a reduction in front face luminance to be inhibited.

BRIEF DESCRIPTION OF THE DRAWINGS

FIG. 3 is (a) a schematic plan view and (b) a schematic cross sectional view each illustrating a view angle-restricting sheet according to an embodiment distinct from the view angle-restricting sheet shown in FIG. 1;

FIG. 4 is a schematic cross sectional view illustrating a touchscreen according to an embodiment of the present invention; and FIG. 5 is a schematic cross sectional view illustrating a touchscreen according to an embodiment distinct from the touchscreen shown in FIG. 4.

DESCRIPTION OF THE PREFERRED EMBODIMENTS

First Embodiment

View Angle-Restricting Sheet 1

Hereinafter, preferred modes for carrying out the present invention will be explained in more detail with reference to the drawings, if necessary.

Figure 1:
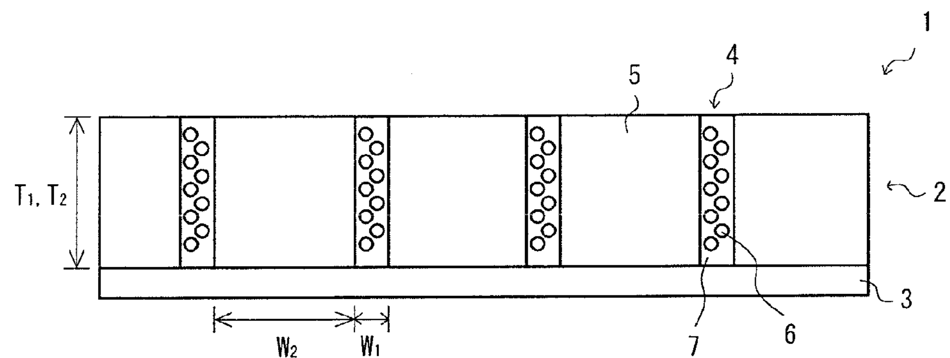
FIG. 1 is a schematic cross sectional view illustrating a view angle-restricting sheet according to an embodiment of the present invention.

A view angle-restricting sheet 1 shown in FIG. 1 includes an optically functional layer 2 and a protective layer 3.

Optically Functional Layer 2

The optically functional layer 2 includes: a plurality of first light transmission sections 4 that are rectangular in cross section and arranged in a multi-stripe fashion; and a plurality of second light transmission sections 5 that are rectangular in cross section and arranged in a multi-stripe fashion. In the optically functional layer 2, the first light transmission sections 4 are arranged substantially parallel to each other at intervals, and each of the second light transmission sections 5 is arranged between adjacent first light transmission sections 4. The front face and the back face of the optically functional layer 2 are formed to be entirely flat. In the optically functional layer 2, the first light transmission sections 4 and the second light transmission sections 5 are arranged alternately without any gap.

The thickness of the optically functional layer 2 is preferably, but not particularly limited to, no less than 50 μm and no greater than 400 μm. The upper limit value of the thickness of the optically functional layer 2 is more preferably 300 μm, and still more preferably 200 μm. On the other hand, the lower limit value of the thickness of the optically functional layer 2 is more preferably 100 μm, and still more preferably 150 μm. When the thickness of the optically functional layer 2 is greater than the upper limit value, the light transmittance may be deteriorated, and it may be difficult to satisfy a requirement of a reduction in thickness of the view angle-restricting sheet 1. To the contrary, when the thickness of the optically functional layer 2 is less than the lower limit value, the amount of the light diffusing agent 6 contained in the first light transmission section 4 may be decreased, and consequently sufficient light diffusing ability may not be exhibited.

The proportion of the surface area occupied by the first light transmission sections 4 with respect to that of the optically functional layer 2 may be no less than 5% and no greater than 40%. The upper limit of the proportion of the surface area occupied by the first light transmission sections 4 with respect to that of the optically functional layer 2 is more preferably 30%, and still more preferably 20%. On the other hand, the lower limit of the proportion of the surface area occupied by the first light transmission sections 4 with respect to that of the optically functional layer 2 is more preferably 10%, and still more preferably 15%. When the proportion of the surface area occupied by the first light transmission sections 4 is greater than the upper limit, displaying a sharp image to the person seeing from the front direction is highly likely to fail. To the contrary, when the proportion of the surface area occupied by the first light transmission sections 4 is less than the lower limit, suitably preventing the leakage of personal information through glimmering from the oblique direction is highly likely to fail.

First Light Transmission Section 4

The first light transmission section 4 contains a light diffusing agent 6 and a resin matrix 7. The light diffusing agent 6 is surrounded by the matrix 7.

Although the synthetic resin for forming the matrix 7 is not particularly limited, a thermoplastic resin may be suitably used. Examples of the thermoplastic resin include polyethylene terephthalate, polyethylene naphthalate, acrylic resins, polycarbonates, polystyrenes, polyolefins, cellulose acetate and weather resistant vinyl chlorides. Of these, as the synthetic resin for forming the matrix 7, polyethylene terephthalate and polycarbonates are preferred in light of superior transparency and strength, as well as ease of controlling birefringence thereof, and polyethylene terephthalate that exhibits an improved deflectional performance is particularly preferred.

An active energy ray-curable resin may also be used as the synthetic resin for forming the matrix 7. When the active energy ray-curable resin is used as the synthetic resin for forming the matrix 7, predetermined shape accuracy can be easily attained, and in addition, the physical strength may be enhanced to improve the scratch-inhibitory ability, leading to the prevention of the alteration of the optical characteristics. The active energy ray-curable resin for suitable use as the synthetic resin for forming the matrix 7 is exemplified by an ultraviolet ray-curable resin.

Examples of the ultraviolet ray-curable resin include ultraviolet ray-curable urethane acrylate resins, ultraviolet ray-curable polyester acrylate resins, ultraviolet ray-curable epoxy acrylate resins, ultraviolet ray-curable polyol acrylate resins and ultraviolet ray-curable epoxy resins, and among these, ultraviolet ray-curable acrylate resins are preferred.

When the ultraviolet ray-curable resin is used as the synthetic resin for forming the matrix 7, a photoinitiator is preferably used in combination. Examples of the photoinitiator include benzoin and derivatives thereof, as well as acetophenone, benzophenone, hydroxybenzophenone, Michler's ketone, α-amyloxime ester, thiaxanthon, etc. and derivatives thereof.

Although the content of the photoinitiator is not particularly limited, the content of the photoinitiator with respect to the ultraviolet ray-curable resin is preferably no less than 1% by mass and no greater than 10% by mass, and more preferably no less than 3% by mass and no greater than 6% by mass. When the content of the photoinitiator is greater than the upper limit, a degree of polymerization of the ultraviolet ray-curable resin may be decreased. To the contrary, when the content of the photoinitiator is less than the lower limit, the curing reaction may not proceed sufficiently.

In addition, an additive such as a curing agent, a plasticizer, a dispersant, various types of levelling agents, an ultraviolet ray-absorbing agent, an antioxidant, a viscosity modifier, a lubricant and a light stabilizer may be appropriately blended into the matrix 7, as needed.

Moreover, the matrix 7 preferably contains a pigment in a dispersion state. The pigment contained in the matrix 7 in a dispersion state is not particularly limited, and exemplified by white pigments, black pigments, blue pigments, red pigments, and the like. Although the pigment contained in the matrix 7 in a dispersion state may be either an inorganic pigment or an organic pigment, an inorganic pigment is suitably used in light of its superior light resistance and the like.

The white pigment is not particularly limited, and examples thereof include calcium carbonate, titanium oxide, zinc oxide, lead carbonate, barium sulfate, silicon oxide, aluminum oxide, and the like.

The black pigment is not particularly limited, and examples thereof include carbon black, black iron oxide, and the like.

The blue pigment is not particularly limited, and examples thereof include cobalt blue, ultramarine, Prussian blue, turquoise blue, manganese blue, phthalocyanine blue, and the like.

The red pigment is not particularly limited, and examples thereof include colcothar (red iron oxide), cadmium red, molybdenum orange, and the like.

The mean particle size of the pigment is preferably, but not particularly limited to, no less than 100 nm and no greater than 30 μm. The upper limit value of the mean particle size of the pigment is more preferably 3 μm, and still more preferably 1 μm. On the other hand, the lower limit value of the mean particle size of the pigment is more preferably 200 nm, and still more preferably 300 nm. When the mean particle size of the pigment is greater than the upper limit value, various characteristics and effects exhibited by the pigment may be deteriorated. To the contrary, when the mean particle size of the pigment is less than the lower limit value, the dispersibility of the pigment may be deteriorated. It is to be noted that the mean particle size used herein means an average of particle sizes of 30 particles randomly sampled from particles observed using an electron microscope at a magnification of ×1,000. In addition, the particle size is defined in terms of Feret's diameter (a distance between parallel lines along a specified direction when a projection is restricted between the parallel lines).

The content of the pigment with respect to the matrix 7 is preferably, but not particularly limited to, no less than 5 parts by mass and no greater than 30 parts by mass. The upper limit value of the content of the pigment is more preferably 25 parts by mass, and still more preferably 20 parts by mass. On the other hand, the lower limit value of the content of the pigment is more preferably 7 parts by mass, and still more preferably 10 parts by mass. When the content of the pigment is greater than the upper limit value, the light diffusion effect exhibited by the first light transmission sections 4 is highly likely to be impaired. To the contrary, when the content of the pigment is less than the lower limit value, various characteristics and effects exhibited by the pigment may be deteriorated.

In the view angle-restricting sheet 1, when the matrix 7 contains the pigment in a dispersion state, heat resistance, thermal dimensional stability, weather resistance, strength, an ability to prevent degradation over time, and the like of the first light transmission sections 4 can be improved. In addition, when the matrix 7 contains the white pigment in a dispersion state, the view angle-restricting sheet 1 enables the rays of light directed toward the first light transmission section 4 from the second light transmission section 5 to be reflected by the second light transmission section 5. As a result, the luminance in the front direction of the view angle-restricting sheet 1 can be improved. In addition, according to the view angle-restricting sheet 1, when the matrix 7 contains the black pigment in a dispersion state, the light absorptivity of the first light transmission section 4 can be enhanced. As a result, the view angle-restricting sheet 1 enables the rays of light having entered the first light transmission section 4 to be absorbed to some extent, and consequently the visibility from the oblique direction to be reduced.

Although the thickness ($T_1$) of the first light transmission section 4 is not particularly limited, the thickness ($T_1$) of the first light transmission section 4 may be the same as the thickness of the optically functional layer 2, in general. In addition, the width ($W_1$) of the first light transmission section 4 is preferably, but not particularly limited to, no less than 2.5 μm and no greater than 100 μm. The upper limit value of the width ($W_1$) of the first light transmission section 4 is more preferably 75 μm, and still more preferably 50 μm. On the other hand, the lower limit value of the width ($W_1$) of the first light transmission section 4 is more preferably 5 μm, and still more preferably 7 μm. When the width ($W_1$) of the first light transmission section 4 is greater than the upper limit value, the quantity of the rays of light diffused by the first light transmission sections 4 may be increased and consequently the visibility of an image from the front direction is highly likely to be impaired. To the contrary, when the width ($W_1$) of the first light transmission section 4 is less than the lower limit value, suitably diffusing the rays of light by the first light transmission sections 4 is highly likely to fail.

The ratio ($T_1/W_1$) of the thickness ($T_1$) to the width ($W_1$) of the first light transmission section 4 is preferably, but not particularly limited to, no less than 4 and no greater than 40. The upper limit of the ratio ($T_1/W_1$) of the thickness ($T_1$) to the width ($W_1$) of the first light transmission section 4 is more preferably 35, and still more preferably 30. On the other hand, the lower limit of the ratio ($T_1/W_1$) of the thickness ($T_1$) to the width ($W_1$) of the first light transmission section 4 is more preferably 7, and still more preferably 10. When the ratio ($T_1/W_1$) of the thickness ($T_1$) to the width ($W_1$) of the first light transmission section 4 does not fall within the above range, displaying a sharp image to the person seeing from the front direction is highly likely to fail.

The average distance between adjacent first light transmission sections 4 is preferably, but not particularly limited to, no less than 6 μm and no greater than 400 μm. The upper limit value of the average distance between adjacent first light transmission sections 4 is more preferably 300 μm, and still more preferably 200 μm. On the other hand, the lower limit value of the average distance between adjacent first light transmission sections 4 is more preferably 50 μm, and still more preferably 100 μm. When the average distance between adjacent first light transmission sections 4 is greater than the upper limit value, suitably preventing the leakage of the personal information through glimmering from the oblique direction is highly likely to fail. To the contrary, when the average distance between adjacent first light transmission sections 4 is less than the lower limit, displaying a sharp image to the person seeing from the front direction is highly likely to fail.

The refractive index ($n_1$) of the matrix 7 is preferably, but not particularly limited to, no less than 1.57, more preferably no less than 1.6, and still more preferably no less than 1.63. When the refractive index ($n_1$) of the matrix 7 falls within the above range, the rays of light having entered the first light transmission section 4 from the second light transmission section 5 can be suitably prevented from exiting as rays of light having a peak along a direction comparatively close to the front direction, and in turn, the sharpness of an image displayed to the person seeing from the front direction can be improved.

It is to be noted that fine particles of, for example, ZnO, $TiO_2$, $CeO_2$, $SnO_2$, ITO, $Cs_{0.33}WO_3$, $Al_2O_3$, $La_2O_3$, $ZrO_2$, $Y_2O_3$ or the like having a high refractive index may be added to the matrix 7 for the purpose of increasing the refractive index. The mean particle size of the fine particles having a high refractive index is preferably, but not particularly limited to, no less than 1 nm and no greater than 100 nm. The upper limit value of the mean particle size of the fine particles having a high refractive index is more preferably 80 nm, and still more preferably 60 nm. On the other hand, the lower limit value of the mean particle size of the fine particles having a high refractive index is more preferably 5 nm, and still more preferably 10 nm. When the mean particle size of the fine particles having a high refractive index is greater than the upper limit value, the transparency of the first light transmission section 4 may be deteriorated. To the contrary, when the mean particle size of the fine particles having a high refractive index is less than the lower limit value, the dispersibility of the fine particles having a high refractive index may be deteriorated.

Although the content of the fine particles having a high refractive index with respect to the matrix 7 is not particularly limited, the content of the fine particles having a high refractive index may be, for example, no less than 10% by mass and no greater than 60% by mass.

The light diffusing agent 6 is contained in the first light transmission section 4 substantially with a uniform density. The light diffusing agent 6 is particles that have a property of diffusing rays of light, and is roughly divided into inorganic fillers and organic fillers. As an inorganic filler, silica, aluminum hydroxide, aluminum oxide, zinc oxide, barium sulfide, magnesium silicate, or a mixture thereof may be used, for example. As a material for an organic filler, an acrylic resin, an acrylonitrile resin, a polyolefin resin, polyurethane, polyvinyl chloride, polystyrene, polyacrylonitrile, polyamide and the like may be used, for example. Among these, an acrylic resin is preferred in light of superior transparency, and polymethyl methacrylate (PMMA) is particularly preferred.

The shape of the light diffusing agent 6 is not particularly limited, and examples thereof include a spherical shape, a spindle shape, a needle-like shape, a rod-like shape, a cubic shape, a platy shape, a flaky shape, a fiber-like shape, and the like; among these, spherical beads that are superior in light-diffusing ability are preferred.

The mean particle size of the light diffusing agent 6 is preferably, but not particularly limited to, no less than 1 μm and no greater than 50 μm. The upper limit value of the mean particle size of the light diffusing agent 6 is more preferably 20 μm, and still more preferably 15 μm. On the other hand, the lower limit value of the mean particle size of the light diffusing agent 6 is more preferably 2 μm, and still more preferably 5 μm. When the mean particle size of the light diffusing agent 6 is greater than the upper limit value, the width ($W_1$) of the first light transmission section 4 may be increased. To the contrary, when the mean particle size of the light diffusing agent 6 is less than the lower limit value, the dispersibility of the light diffusing agent 6 may be deteriorated.

The mass ratio of the light diffusing agent 6 to the matrix 7 is preferably, but not particularly limited to, no less than 0.1 and no greater than 2. The upper limit of the mass ratio of the light diffusing agent 6 to the matrix 7 is more preferably 1, and still more preferably 0.5. On the other hand, the lower limit of the mass ratio of the light diffusing agent 6 to the matrix 7 is more preferably 0.2, and still more preferably 0.3. When the mass ratio of the light diffusing agent 6 to the matrix 7 is greater than the upper limit, the effect of fixing the light diffusing agent 6 may be deteriorated. To the contrary, when the mass ratio of the light diffusing agent 6 to the matrix 7 is less than the lower limit, the light-diffusing ability may be insufficient.

The absolute value of the difference ($|n_1-n_3|$) between the refractive index ($n_1$) of the matrix 7 and the refractive index ($n_3$) of the light diffusing agent 6 is preferably, but not particularly limited to, no less than 0.03, more preferably no less than 0.06, and still more preferably no less than 0.09. When the absolute value of the difference ($|n_1-n_3|$) between the refractive index ($n_1$) of the matrix 7 and the refractive index ($n_3$) of the light diffusing agent 6 is less than the lower limit, the rays of light having entered the first light transmission section 4 may not be able to be suitably diffused at a boundary between the matrix 7 and the light diffusing agent 6.

In addition, the refractive index ($n_1$) of the matrix 7 is preferably greater than the refractive index ($n_3$) of the light diffusing agent 6. According to the view angle-restricting sheet 1, when the refractive index ($n_1$) of the matrix 7 is greater than the refractive index ($n_3$) of the light diffusing agent 6, rays of light can be suitably diffused at a boundary between the matrix 7 and the light diffusing agent 6.

Second Light Transmission Section 5

The second light transmission section 5 contains a transparent, in particular, colorless and transparent, synthetic resin as a principal component, since the second light transmission section 5 needs to transmit rays of light. Although the synthetic resin as a principal component of the second light transmission section 5 is not particularly limited, examples thereof include synthetic resins similar to the synthetic resins for forming the matrix 7 of the first light transmission section 4. In addition, additives similar to those for the first light transmission section 4 may be added to the second light transmission section 5.

Although the thickness ($T_2$) of the second light transmission section 5 is not particularly limited, the thickness ($T_2$) of the second light transmission section 5 may be the same as the thickness of the optically functional layer 2, in general.

The ratio ($T_2/W_2$) of the thickness ($T_2$) to the width ($W_2$) of the second light transmission section 5 is preferably, but not particularly limited to, no less than 1 and no greater than 8.5. The upper limit of the ratio ($T_2/W_2$) of the thickness ($T_2$) to the width ($W_2$) of the second light transmission section 5 is more preferably 5, and still more preferably 4. On the other hand, the lower limit of the ratio ($T_2/W_2$) of the thickness ($T_2$) to the width ($W_2$) of the second light transmission section 5 is more preferably 1.5, and still more preferably 2. When the thickness ratio ($T_2/W_2$) is greater than the upper limit, the quantity of the rays of light exiting from the front face side of the second light transmission section 5 may be reduced, and the rays of light diffused by the first light transmission sections 4 may be increased, leading to deterioration of the sharpness of an image when the image is seen from the front direction. To the contrary, when the thickness ratio ($T_2/W_2$) is less than the lower limit, the view angle may be excessively increased, and the leakage of personal information and the like to a person seeing from the oblique direction is highly likely to be caused.

The ratio ($W_2/W_1$) of the width ($W_2$) of the second light transmission section 5 to the width ($W_1$) of the first light transmission section 4 is preferably, but not particularly limited to, no less than 1.5 and no greater than 15. The upper limit of the ratio ($W_2/W_1$) of the width ($W_2$) of the second light transmission section 5 to the width ($W_1$) of the first light transmission section 4 is more preferably 12, and still more preferably 10. On the other hand, the lower limit of the ratio ($W_2/W_1$) of the width ($W_2$) of the second light transmission section 5 to the width ($W_1$) of the first light transmission section 4 is more preferably 3, and still more preferably 5. When the ratio ($W_2/W_1$) of the width ($W_2$) of the second light transmission section 5 to the width ($W_1$) of the first light transmission section 4 is greater than the upper limit, the view angle may be excessively increased. To the contrary, when the ratio ($W_2/W_1$) of the width ($W_2$) of the second light transmission section 5 to the width ($W_1$) of the first light transmission section 4 is less than the lower limit, the sharpness of an image is highly likely to be impaired by the rays of light diffused by the first light transmission sections 4 when the image is seen from the front direction.

It is preferred that the refractive index ($n_2$) of the second light transmission section 5 differs from the refractive index ($n_1$) of the matrix 7. In addition, the refractive index ($n_2$) of the second light transmission section 5 is preferably less than the refractive index ($n_1$) of the matrix 7. In the view angle-restricting sheet 1, when the refractive index ($n_2$) of the second light transmission section 5 is less than the refractive index ($n_1$) of the matrix 7, the rays of light having entered the first light transmission section 4 from the second light transmission section 5 can be directed toward a direction perpendicular to the front direction. Therefore, the view angle-restricting sheet 1 can prevent the rays of light having a peak along a direction comparatively close to the front direction from exiting from the front face side of the first light transmission section 4, and in turn, the sharpness of an image displayed to the person seeing from the front direction can be improved.

Moreover, in a case where the refractive index ($n_2$) of the second light transmission section 5 is less than the refractive index ($n_1$) of the matrix 7, the difference ($n_1-n_2$) between the refractive index ($n_1$) of the matrix 7 and the refractive index ($n_2$) of the second light transmission section 5 is preferably, but not particularly limited to, no less than 0.15, more preferably no less than 0.3, and still more preferably no less than 0.45. When the difference ($n_1-n_2$) between the refractive index ($n_1$) of the matrix 7 and the refractive index ($n_2$) of the second light transmission section 5 is less than the lower limit, the sharpness of an image displayed to the person seeing from the front direction is highly likely to be difficult to be suitably improved.

Protective Layer 3

The protective layer 3 is provided on the back face of the optically functional layer 2. The protective layer 3 contains a transparent, in particular, colorless and transparent, synthetic resin as a principal component, since the protective layer 3 needs to transmit rays of light. Although the synthetic resin used as a principal component of the protective layer 3 is not particularly limited, examples thereof include synthetic resins similar to those used for the second light transmission section 5. In addition, additives similar to those used for the second light transmission section 5 may be added to the protective layer 3.

The thickness of the protective layer 3 is preferably, but not particularly limited to, no less than 1 μm and no greater than 10 μm. The upper limit value of the thickness of the protective layer 3 is more preferably 8 μm, and still more preferably 6 μm. On the other hand, the lower limit value of the thickness of the protective layer 3 is more preferably 2 μm, and still more preferably 3 μm. When the thickness of the protective layer 3 is greater than the upper limit value, it is highly likely to be difficult to satisfy a requirement of a reduction in thickness of the view angle-restricting sheet 1. To the contrary, when the thickness of the protective layer 3 is less than the lower limit value, suitably increasing the strength of the view angle-restricting sheet 1 is highly likely to fail.

Although the refractive index ($n_4$) of the protective layer 3 is not particularly limited, it is preferred that $n_4$ is equal to $n_2$. According to the view angle-restricting sheet 1, when $n_4$ is equal to $n_2$, a loss of the rays of light may be inhibited, leading to an improvement of the front face luminance.

Mechanism of Diffusion of Rays of Light

Figure 2:
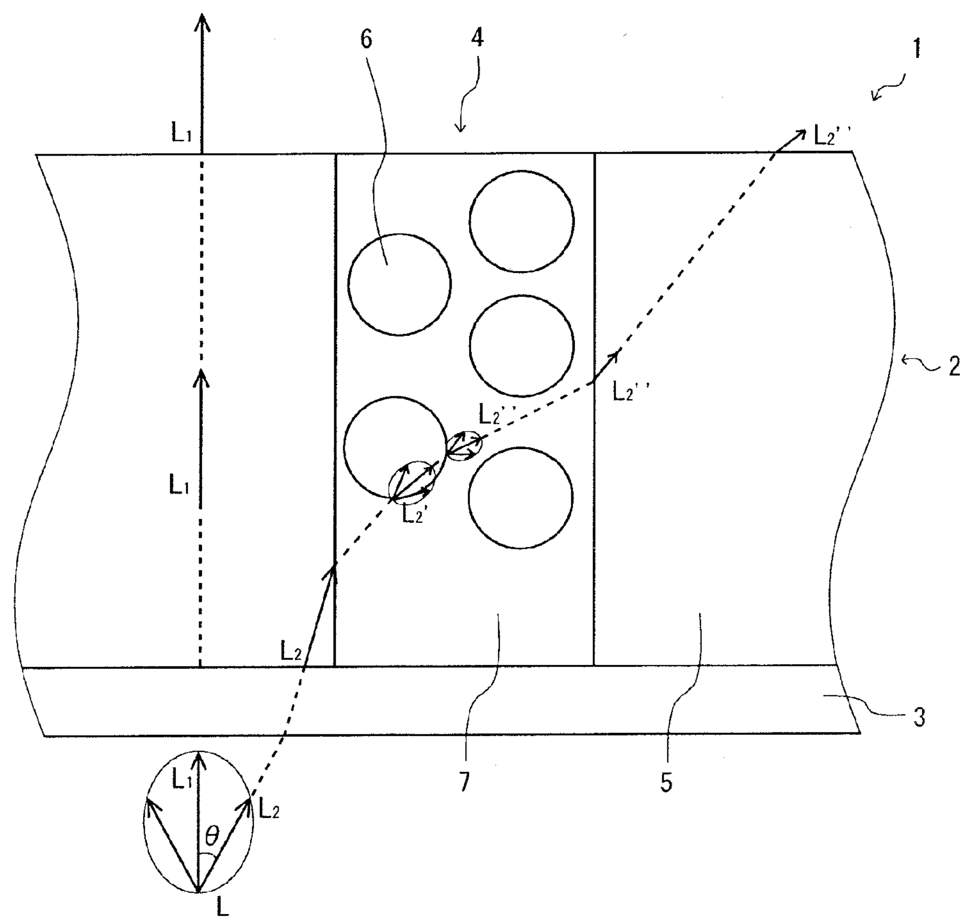
FIG. 2 is a diagram illustrating a mechanism of the diffusion of rays of light having entered the view angle-restricting sheet shown in FIG. 1 from the back face side.

Next, referring to FIG. 2, a mechanism of the diffusion of the rays of light having entered from the back face side of the view angle-restricting sheet 1 will be explained. It is to be noted that, in FIG. 2, the rays of light L enter from the back face side of the protective layer 3 and exhibit a distribution with a peak in the front direction.

First, among the rays of light L, the rays of light $L_1$ entering substantially perpendicularly from the back face side of the protective layer 3 pass through the second light transmission section 5, and exit substantially perpendicularly from the front face side of the second light transmission section 5.

On the other hand, among the rays of light L, the rays of light $L_2$ entering from the back face side of the protective layer 3 at an angle θ with respect to the rays of light $L_1$ are refracted at a boundary between the second light transmission section 5 and the first light transmission section 4 toward a direction perpendicular to the front direction, when entering the first light transmission section 4 from the second light transmission section 5. Further, the rays of light L; are diffused at a boundary between the matrix 7 and the light diffusing agent 6 in the first light transmission section 4. Then, the rays of light $L_2$" which are diffused light of the rays of light $L_2$ are refracted toward the front direction at the boundary between the first light transmission section 4 and the second light transmission section 5, and then exit from the front face side of the second light transmission section 5 at a certain angle with respect to the front direction, with the intensity of the rays of light $L_2$" being reduced as compared with the intensities of the rays of light $L_2$ and the rays of light $L_2$'.

Thus, according to the view angle-restricting sheet 1, a sharp image can be displayed in the front direction using the rays of light not entering the first light transmission section 4 among the rays of light having entered the second light transmission section 5 from the protective layer 3, and the leakage of the information through glimmering from the oblique direction can be prevented by allowing the rays of light having entered the first light transmission section 4 to exit after being suitably diffused.

Production Method

A method for producing the view angle-restricting sheet 1 is not particularly limited as long as a view angle-restricting sheet having the aforementioned structure can be produced, and various methods may be employed. The method for producing the view angle-restricting sheet 1 generally includes steps of: (1) integrally or separately providing the protective layer 3 and the second light transmission section 5; and (2) providing the first light transmission section 4.

Specific examples of the step of providing the protective layer 3 and the second light transmission section 5 include:

(a) a forming process that involves overlaying a synthetic resin on a sheet mold having a reversal shape of the front face of the second light transmission section 5, and peeling the sheet mold;

(b) an injection molding process that involves injecting a molten resin into a die having a reversal shape of the front face of the second light transmission section 5;

(c) a process that involves reheating a resin formed into a sheet, pressing the resin between a die similar to the die mentioned above and a metal plate, and thereby transferring the shape;

(d) an extrusion sheet molding process that involves passing a resin in a molten state through a nip between a roll mold having a reversal shape of the front face of the second light transmission section 5 therearound and other roll, and thereby transferring the shape;

(e) a process that involves coating an ultraviolet ray-curable resin on the protective layer 3, pressing the ultraviolet ray-curable resin to a sheet mold, a die or a roll mold each having a reversal shape similar to that mentioned above to transfer the shape to the uncured ultraviolet ray-curable resin, and then irradiating the uncured ultraviolet ray-curable resin with an ultraviolet ray to cure the ultraviolet ray-curable resin;

(f) a process that involves coating an uncured ultraviolet ray-curable resin on a die or roll mold each having a reversal shape similar to that mentioned above to fill the die or roll mold therewith, followed by pressing and levelling with the protective layer 3, and then irradiating the ultraviolet ray-curable resin with an ultraviolet ray to cure the ultraviolet ray-curable resin; and the like.

Moreover, specific examples of the step of providing the first light transmission section 4 include (a) a process that involves: filling a depressed part of a sheet constituting the protective layer 3 and the second light transmission section 5 with a liquid resin composition containing the light diffusing agent 6; drying the liquid resin composition; then irradiating the liquid resin composition with an ultraviolet ray and the like to cure the liquid resin composition, and thereby providing a first light transmission section 4 having a predetermined thickness. Moreover, although a method for applying the resin composition containing the light diffusing agent 6 is not particularly limited, examples thereof include a spin coating method, a blade coating method, a die coating method, and the like.

The view angle-restricting sheet 1 includes: the first light transmission sections 4; and the second light transmission sections 5 each arranged between adjacent first light transmission sections 4, and the first light transmission sections 4 contains the light diffusing agent 6 and the resin matrix 7. Therefore, the rays of light having entered the second light transmission section 5 from the back face side in a certain oblique direction are allowed to exit after being diffused by the first light transmission sections 4. On the other hand, the view angle-restricting sheet 1 enables the rays of light having entered from the back face side substantially perpendicularly to the second light transmission section 5 to exit from the front face side of the second light transmission section 5 substantially perpendicularly. Therefore, the view angle-restricting sheet 1 can display a sharp image to a person seeing from the front direction (user), and can prevent the leakage of personal information and the like to a person seeing from the oblique direction by blurring the image displayed. The view angle-restricting sheet 1 prevents the leakage of personal information and the like by diffusing, by means of the first light transmission sections 4, the rays of light having entered the second light transmission section 5 from the back face side in a certain oblique direction; therefore, a reduction in front face luminance can be inhibited. According to the view angle-restricting sheet 1, since the proportion of the surface area occupied by the first light transmission sections 4 with respect to that of the optically functional layer 2 falls within the aforementioned range, the leakage of personal information and the like through glimmering from the oblique direction can be prevented, and a reduction of the sharpness of an image can be inhibited using the rays of light diffused by the first light transmission sections 4 when the image is seen from the front direction.

According to the view angle-restricting sheet 1, since the first light transmission sections 4 and the second light transmission sections 5 are arranged without any gap, the sharpness of an image in the front direction and the degree of blurring of the image in the oblique direction may be suitably controlled.

According to the view angle-restricting sheet 1, since the front face of the optically functional layer 2 is entirely flat, outgoing rays of light can be easily controlled. In addition, according to the view angle-restricting sheet 1, a constant thickness of the optically functional layer 2 can be maintained, and ease of use and optical uniformity thereof can be improved.

According to the view angle-restricting sheet 1, since the back face of the optically functional layer 2 is entirely flat, incident rays of light can be easily controlled. In addition, according to the view angle-restricting sheet 1, a constant thickness of the optically functional layer 2 can be maintained, and ease of use and optical uniformity can be improved.

Since the view angle-restricting sheet 1 includes the protective layer 3 provided on one face side of the optically functional layer 2, the moldability, the strength, the shape stability and the like can be improved.

Second Embodiment

View Angle-Restricting Sheet 11

The view angle-restricting sheet 11 shown in FIG. 3 includes an optically functional layer 12 and a protective layer 3. Since the protective layer 3 in this embodiment is similar to the protective layer 3 shown in FIG. 1, explanation thereof will be omitted through designating the identical number.

Optically Functional Layer 12

The optically functional layer 12 includes: a plurality of first light transmission sections 4 that are rectangular in cross section and arranged in a multi-stripe fashion; second light transmission sections 14 each arranged between adjacent first light transmission sections 4; and third light transmission sections 13 provided crosswise with respect to the first light transmission section 4. Since the first light transmission section 4 in this embodiment is similar to the first light transmission section 4 shown in FIG. 1, explanation thereof will be omitted through designating the identical number. The third light transmission sections 13 are provided such that they cross the first light transmission section 4 substantially at a right angle. The third light transmission sections 13 are provided substantially parallel to each other substantially at regular intervals. The front face and the back face of the optically functional layer 12 are formed to be entirely flat. In the optically functional layer 12, the first light transmission section 4, the second light transmission section 14 and the third light transmission section 13 are arranged without any gap. The thickness of the optically functional layer 12 is similar to the thickness of the optically functional layer 2.

Third Light Transmission Section 13

The third light transmission section 13 contains a light diffusing agent 6 and a resin matrix 7. The light diffusing agent 6 is surrounded by the matrix 7. Since the light diffusing agent 6 contained in the third light transmission section 13 is similar to the light diffusing agent 6 contained in the first light transmission section 4, explanation thereof will be omitted through designating the identical number. In addition, since the matrix 7 contained in the third light transmission section 13 is similar to the matrix 7 contained in the first light transmission section 4, explanation thereof will be omitted through designating the identical number. The thickness ($T_3$), the width ($W_3$) and the ratio ($T_3/W_3$) of the thickness ($T_3$) to the width ($W_3$) of the third light transmission section 13 as well as the average distance between adjacent third light transmission sections 13 are similar to those for the first light transmission sections 4.

Second Light Transmission Section 14

The second light transmission section 14 contains a transparent, in particular, colorless and transparent, synthetic resin as a principal component, since the second light transmission section 14 needs to transmit rays of light. The synthetic resin used as the principal component of the second light transmission section 14 is similar to the synthetic resin used as the principal component of the second light transmission section 5. Additives similar to those which may be added to the second light transmission section 5 may be added to the second light transmission section 14. The thickness ($T_2$) and the ratio ($T_2/W_2$) of the thickness ($T_2$) to the width ($W_2$) of the second light transmission section 14, as well as the ratio ($W_2/W_1$) of the width ($W_2$) of the second light transmission section 14 to the width ($W_1$) of the first light transmission section 4, and the refractive index ($n_2$) of the second light transmission section 14 are similar to those of the second light transmission section 5.

Production Method

A method for producing the view angle-restricting sheet 11 is not particularly limited as long as a view angle-restricting sheet having the aforementioned structure can be produced, and various methods may be employed. The method for producing the view angle-restricting sheet 11 includes steps of, in general: (1) integrally or separately providing the protective layer 3 and the second light transmission section 14; and (2) providing the first light transmission section 4 and the third light transmission section 13. The step (1) of integrally or separately providing the protective layer 3 and the second light transmission section 14 and the step (2) of providing the first light transmission section 4 and the third light transmission section 13 are exemplified by steps similar to those described in connection with the view angle-restricting sheet 1.

According to the view angle-restricting sheet 11, since the optically functional layer 12 includes the third light transmission sections 13 provided crosswise with respect to the first light transmission section 4, the rays of light having entered from the back face side in a certain oblique direction with respect to the second light transmission section 14 are allowed to exit after being diffused by the first light transmission sections 4 and the third light transmission sections 13. Therefore, the view angle-restricting sheet 11 can remarkably reduce the possibility of the leakage of personal information and the like to the person seeing from the oblique direction.

Third Embodiment

Touchscreen 21

A touchscreen 21 shown in FIG. 4 includes a substrate 22, a transparent electrically conductive layer 23, a tacky layer 24, a substrate 25, and a view angle-restricting sheet 1. In this embodiment, the view angle-restricting sheet 1 is similar to the view angle-restricting sheet 1 shown in FIG. 1, and therefore explanation thereof will be omitted through designating the identical number. The touchscreen 21 is provided on the front face side of a display panel (not shown in the Figure). The touchscreen 21 allows an image light emitted from the display panel to exit toward the front face side. The touchscreen 21 is provided as a capacitive touchscreen.

The substrate 22 is made from a transparent insulating material. Specifically, the substrate 22 is provided as a glass substrate. The transparent electrically conductive layer 23 is made from an electrically conductive material having transparency and electric conductivity. A material for forming the transparent electrically conductive layer 23 is exemplified by an inorganic metal and an organic electrically conductive polymer. Examples of the inorganic metal include gold, silver, copper, platinum, nickel, tin oxide and indium tin oxide (ITO). Examples of the organic electrically conductive polymer include organic electrically conductive compositions containing polyaniline, polythiophene, polypyrrole, polyquinoxaline, and the like. Among these, ITO or a polythiophene-based material is preferred in light of favorable optical characteristics, appearance and electric conductivity. The tacky layer 24 provides adhesive bonding between the transparent electrically conductive layer 23 and the substrate 25. Although a material for forming the tacky layer 24 is not particularly limited, examples thereof include well-known tacky resins such as acrylic resins and urethane resins. The substrate 25 is a transparent insulating substrate and is provided as a glass substrate similarly to the substrate 22. The view angle-restricting sheet 1 is overlaid on the back face of the substrate 25. The view angle-restricting sheet 1 is overlaid on the back face of the substrate 25 via a tacky layer (not shown in the Figure). The view angle-restricting sheet 1 is arranged such that the longitudinal direction of the first light transmission section 4 is parallel to the vertical display direction of the touchscreen 21.

Since the view angle-restricting sheet 1 is provided on the front face side of the display panel, a sharp image can be displayed to the person seeing from the front direction, and the leakage of personal information and the like through glimmering from an oblique direction can be suitably prevented.

The touchscreen 21 enables the rays of light having entered from the back face side of the view angle-restricting sheet 1 in a certain oblique direction with respect to the second light transmission section 5 to exit after being diffused by the first light transmission sections 4. On the other hand, the touchscreen 21 enables the rays of light having entered from the back face side of the view angle-restricting sheet 1 substantially perpendicularly to the second light transmission section 5 to exit from the front face side of the second light transmission section 5 substantially perpendicularly. Therefore, the touchscreen 21 can display a sharp image to a person seeing from the front direction (user), and can prevent the leakage of personal information and the like to a person seeing from the oblique direction by blurring the image displayed.

Fourth Embodiment

Touchscreen 31

A touchscreen 31 shown in FIG. 5 includes a view angle-restricting sheet 1, a substrate 22, a transparent electrically conductive layer 23, a tacky layer 24, and a substrate 25. In this embodiment, the view angle-restricting sheet 1 is similar to the view angle-restricting sheet 1 shown in FIG. 1, and the substrate 22, the transparent electrically conductive layer 23, the tacky layer 24 and the substrate 25 are similar to those of the touchscreen 21 shown in FIG. 4; therefore, explanation thereof will be omitted through designating the identical numbers. The touchscreen 31 is provided on the front face side of a display panel (not shown in the Figure). The touchscreen 31 allows an image light emitted from the display panel to exit toward the front face side. The touchscreen 31 is provided as a capacitive touchscreen. The view angle-restricting sheet 1 is arranged such that the longitudinal direction of the first light transmission section 4 is parallel to the vertical display direction of the touchscreen 31.

Since the view angle-restricting sheet 1 is provided on the front face side of the display panel, a sharp image can be displayed to the person seeing from the front direction, and the leakage of personal information and the like through glimmering from the oblique direction can be suitably prevented.

The touchscreen 31 enables the rays of light having entered from the back face side of the view angle-restricting sheet 1 in a certain oblique direction with respect to the second light transmission section 5 to exit after being diffused by the first light transmission sections 4. On the other hand, the touchscreen 31 enables the rays of light having entered from the back face side of the view angle-restricting sheet 1 substantially perpendicularly to the second light transmission section 5 to exit from the front face side of the second light transmission section 5 substantially perpendicularly. Therefore, the touchscreen 31 can display a sharp image to a person seeing from the front direction (user), and can prevent the leakage of personal information and the like to a person seeing from the oblique direction by blurring the image displayed.

OTHER EMBODIMENTS

It is to be noted that the view angle-restricting sheet according to the embodiments of the present invention and the flat panel display that includes the view angle-restricting sheet may be carried out in various modified or improved embodiments, in addition to the embodiments described above.

For example, the view angle-restricting sheet may not include the protective layer, or alternatively the protective layer may be provided on the front face side of the optically functional layer, or the protective layer may be provided on both the front face side and the back face side of the optically functional layer. In a case where the protective layer is not included, a method for producing the view angle-restricting sheet is exemplified by a method that involves: integrally or separately providing a predetermined substrate layer and second light transmission sections provided on the substrate layer; providing first light transmission sections in depressed parts provided between adjacent second light transmission sections; and thereafter slitting the substrate layer. Alternatively, in a case where the protective layer is provided on both the front face side and the back face side, a method for producing the view angle-restricting sheet is exemplified by a method that involves further applying a protective layer by way of a well-known method on a remaining face side (i.e., a face side having no protective layer) of a sheet that is constituted with an optically functional layer and a protective layer provided on one face side of the optically functional layer.

According to the view angle-restricting sheet, the second light transmission section may not necessarily contain a synthetic resin. In the view angle-restricting sheet, the second light transmission section may be a hollow section containing air. In addition, in the view angle-restricting sheet, the first light transmission section and the second light transmission section may not be necessarily arranged without any gap. In the view angle-restricting sheet, even when a gap exists between the first light transmission section and the second light transmission section, rays of light can be refracted at a boundary between the first light transmission section and the gap or a boundary between the second light transmission section and the gap, and in turn, the diffusing ability can be improved.

According to the view angle-restricting sheet, the front face and/or the back face of the optically functional layer may not be entirely flat. According to the view angle-restricting sheet, visibility, a view angle and the like from the front direction can be adjusted, for example, by changing the thickness of the first light transmission section and the thickness of the second light transmission section. According to the view angle-restricting sheet, other layer(s) may be overlaid between the protective layer and the optically functional layer. According to the view angle-restricting sheet, the first light transmission sections and/or the third light transmission sections may not necessarily be arranged at regular intervals.

In the view angle-restricting sheet, the first light transmission sections and the third light transmission sections may not be necessarily provided so as to cross each other substantially at a right angle. In addition, the view angle-restricting sheet may be formed such that an average distance between adjacent third light transmission sections is greater than an average distance between adjacent first light transmission sections. When the average distance between adjacent first light transmission sections differs from the average distance between adjacent third light transmission sections, the view angle-restricting sheet enables a view angle to be suitably adjusted along the longitudinal direction and along the transverse direction.

The view angle-restricting sheet can be provided on various types of touchscreens other than the capacitive touchscreen, such as a resistive touchscreen and an electromagnetic inductive touchscreen. Even in a case where the view angle-restricting sheet is provided on the touchscreen, the view angle-restricting sheet may not necessarily be provided such that the longitudinal direction of the first light transmission section and the vertical display direction of the touchscreen are parallel to each other. The view angle-restricting sheet may not necessarily be used on a touchscreen, and may be provided on the front face side of a display panel of various flat panel displays such as liquid crystal displays, plasma displays and organic EL displays.

EXAMPLES

Hereinafter, the present invention will be explained in more detail by way of Examples, but the present invention should not in any way be construed to be limited by these Examples.

Example 1

An acrylic resin was fed to a T die, and then subjected to extrusion molding to form an extruded article in a sheet form for forming a second light transmission section. Separately, a coating liquid was prepared that contained: a material for forming a matrix that contained a polyfunctional urethane (meth)acrylate and tin-containing indium oxide particles (ITO) (average primary particle size: 30 nm); and a light diffusing agent (acrylic resin beads) contained in a mass ratio of 0.4 with respect to the material for forming a matrix, and the coating liquid was coated on a release paper to form a sheet element. A release paper was further overlaid on the sheet element, and then the sheet element was pressed such that a predetermined thickness was attained, and thereby a sheet element for forming a first light transmission section was formed. Thereafter, the sheet element for forming a first light transmission section and the sheet element for forming a second light transmission section were sequentially overlaid and bonded to form a multilayered article in which the first light transmission sections and the second light transmission sections were sequentially overlaid. Then, the multilayered article was cut at a predetermined interval along the perpendicular direction, and on one cutting plane (back face side), a protective layer that contained a material similar to that of the second light transmission section and had an average thickness of 5 μm was overlaid to obtain a view angle-restricting sheet according to Example 1.

Examples 2 to 6 and Comparative Examples 1 and 2

View angle-restricting sheets according to Examples 2 to 6 and Comparative Examples 1 and 2 were obtained in a similar manner to Example 1 except that the ratio ($T_1/W_1$) of the thickness ($T_1$) to the width ($W_1$), the mean particle size of the light diffusing agent, the proportion of the surface area occupied by the first light transmission sections with respect to that of the optically functional layer, and the ratio ($T_2/W_2$) of the thickness ($T_2$) to the width ($W_2$) shown in Table 1 were attained. It is to be noted that the "the proportion of the surface area occupied by the first light transmission sections with respect to that of the optically functional layer" was calculated based on the surface area occupied by the first light transmission sections and the surface area of the optically functional layer in a planar view.

Comparative Example 3

An acrylic resin was fed to a T die, and then subjected to extrusion molding to form an extruded article in a sheet form for forming a second light transmission section. Separately, a coating liquid was prepared that contained a polyfunctional urethane (meth)acrylate, and a black pigment (carbon black) as a light absorbing material contained in a proportion of 35 parts by mass with respect to 100 parts by mass of the polyfunctional urethane (meth)acrylate. Thereafter, the coating liquid was coated on the front face of the extruded article, dried at 80° C., and irradiated with an ultraviolet ray to allow curing thereof, and thereby a laminate that included a first light transmission section and a second light transmission section. Next, laminates having a structure similar to that of the laminate formed above were overlaid and bonded sequentially to form a multilayered article in which the first light transmission sections and the second light transmission sections were sequentially overlaid. Then, the multilayered article was cut at a predetermined interval along the perpendicular direction, and on one cutting plane (back face side), a protective layer that contained a material similar to that of the second light transmission section and had an average thickness of 5 μm was overlaid to obtain a view angle-restricting sheet according to Comparative Example 3.

Evaluations of Characteristics

The view angle-restricting sheets according Examples 1 to 6 and Comparative Examples 1 to 3 were each overlaid on the front face of a substrate of a touchscreen, and a view angle characteristic and a luminance characteristic were evaluated. In addition, as Comparative Example 4, the view angle characteristic and the luminance characteristic in the case of not using any view angle-restricting sheet were evaluated.

The evaluation of the view angle characteristic was made as follows based on the visibility of the displayed image in visual inspection from the oblique direction (0°±450) when a backlight was turned on:

(a) "A" in a case where the displayed image could not be discriminated;

(b) "B" in a case where the displayed image could be hardly discriminated;

(c) "C" in a case where the displayed image could be vaguely discriminated; and (d) "D" in a case where the displayed image could be clearly discriminated.

The results are shown in Table 1.

The evaluation of the luminance characteristic was made as follows based on the visibility of the displayed image in visual inspection from the front direction (0°±50) when a backlight was turned on:

(a) "A" in a case where a reduction in luminance was not found, and an image displayed on a display screen was seen sharply;

(b) "B" in a case where a reduction in luminance was not found, but an image displayed on a display screen was seen accompanied by somewhat blurring;

(c) "C" in a case where a reduction in luminance was found to some extent, and an image displayed on a display screen was seen accompanied by somewhat blurring; and (d) "D" in a case where a reduction in luminance was found.

The results are shown in Table 1.

TABLE 1

| | Optically functional layer | | | | | | | | | | |
|---|---|---|---|---|---|---|---|---|---|---|---|
| | | first light transmission section | | | | | | second light transmission section | | | |
| | average thickness (μm) | ratio ($T_1/W_1$) of thickness ($T_1$) to width ($W_1$) | refractive index of matrix ($n_1$) | refractive index of light diffusing agent ($n_3$) | mean particle size of light diffusing agent (μm) | mass ratio of light diffusing agent to matrix | proportion of surface area occupied in optically functional layer (%) | ratio ($T_2/W_2$) of thickness ($T_2$) to width ($W_2$) | refractive index ($n_2$) | View angle characteristic | Luminance characteristic |
| Example 1 | 150 | 20 | 1.68 | 1.49 | 5 | 0.4 | 9.1 | 2 | 1.49 | B | A |
| Example 2 | 150 | 20 | 1.68 | 1.49 | 5 | 0.4 | 16.7 | 4 | 1.49 | A | A |

TABLE 1-continued

| | Optically functional layer | | | | | | | | | | |
|---|---|---|---|---|---|---|---|---|---|---|---|
| | | first light transmission section | | | | | | second light transmission section | | | |
| | average thickness (μm) | ratio ($T_1/W_1$) of thickness ($T_1$) to width ($W_1$) | refractive index of matrix ($n_1$) | refractive index of light diffusing agent ($n_3$) | mean particle size of light diffusing agent (μm) | mass ratio of light diffusing agent to matrix | proportion of surface area occupied in optically functional layer (%) | ratio ($T_2/W_2$) of thickness ($T_2$) to width ($W_2$) | refractive index ($n_2$) | View angle characteristic | Luminance characteristic |
| Example 3 | 150 | 20 | 1.68 | 1.49 | 5 | 0.4 | 31.1 | 9 | 1.49 | A | C |
| Example 4 | 150 | 10 | 1.68 | 1.49 | 5 | 0.4 | 23.1 | 3 | 1.49 | A | B |
| Example 5 | 150 | 30 | 1.68 | 1.49 | 3 | 0.4 | 9.1 | 3 | 1.49 | C | A |
| Example 6 | 150 | 42 | 1.68 | 1.49 | 2 | 0.4 | 6.7 | 3 | 1.49 | C | A |
| Comparative Example 1 | 150 | 20 | 1.68 | 1.49 | 5 | 0.4 | 4.8 | 1 | 1.49 | D | A |
| Comparative Example 2 | 150 | 3 | 1.68 | 1.49 | 5 | 0.4 | 50 | 3 | 1.49 | A | D |
| Comparative Example 3 | 150 | 20 | — | — | — | — | 16.7 | 4 | 1.49 | A | D |
| Comparative Example 4 | — | — | — | — | — | — | — | — | — | D | A |

As shown in Table 1 set forth above, when the view angle-restricting sheets according to Examples 1 to 6 were used, the requirement of the view angle characteristic was satisfied and a superior luminance characteristic was also exhibited, as compared with those according to Comparative Examples 1 to 4.

INDUSTRIAL APPLICABILITY

As set forth above, the view angle-restricting sheet and the flat panel display that includes the view angle-restricting sheet according to the present invention enable the leakage of personal information and the like through glimmering from an oblique direction to be suitably prevented and a reduction in front face luminance to be inhibited; and therefore, these can be suitably used in various flat panel displays such as liquid crystal displays, plasma displays and organic EL displays.

EXPLANATION OF THE REFERENCE SYMBOLS

1 view angle-restricting sheet
2 optically functional layer
3 protective layer
4 first light transmission section
5 second light transmission section
6 light diffusing agent
7 matrix
11 view angle-restricting sheet
12 optically functional layer
13 third light transmission section
14 second light transmission section
21 touchscreen
22 substrate
23 transparent electrically conductive layer
24 tacky layer
25 substrate
31 touchscreen

The invention claimed is:

1. A view angle-restricting sheet comprising an optically functional layer which comprises:

a plurality of first light transmission sections that are rectangular in cross section and arranged in a multi-stripe fashion; and one or more second light transmission section(s) that is/are each arranged between adjacent first light transmission sections, wherein in the view angle restricting sheet, the first light transmission sections comprises a light diffusing agent and a resin matrix, a proportion of a surface area occupied by the first light transmission sections with respect to a surface area of the optically functional layer is no less than 5% and no greater than 40%, a refractive index ($n_1$) of the matrix is greater than a refractive index ($n_2$) of the second light transmission section and a difference ($n_1-n_2$) between the refractive index ($n_1$) of the matrix and the refractive index ($n_2$) of the second light transmission section is no less than 0.15, the refractive index ($n_1$) of the matrix is greater than a refractive index ($n_3$) of the light diffusing agent, and a difference ($n_1-n_3$) between a refractive index ($n_1$) of the matrix and a refractive index ($n_3$) of the light diffusing agent is no less than 0.03, a ratio ($T_1/W_1$) of a thickness ($T_1$) to a width ($W_1$) of the first light transmission section is no less than 7 and no greater than 40, and an average distance between adjacent first light transmission sections arranged is no less than 50 μm and no greater than 400 μm, a sharp image is displayed in a front direction using rays of light not entering the first light transmission section among rays of light having entered the second light transmission section, and leakage of information through glimmering from an oblique direction is prevented by allowing rays of light having entered the first light transmission section to exit after being diffused.

2. The view angle-restricting sheet according to claim 1, wherein a mass ratio of the light diffusing agent to the matrix is no less than 0.1 and no greater than 2.

3. The view angle-restricting sheet according to claim 1, wherein a refractive index ($n_1$) of the matrix is no less than 1.57.

4. The view angle-restricting sheet according to claim 1, wherein the first light transmission section and the second light transmission section are arranged without any gap.

5. The view angle-restricting sheet according to claim 1, wherein a front face of the optically functional layer is entirely flat.

6. The view angle-restricting sheet according to claim 1, wherein a back face of the optically functional layer is entirely flat.

7. The view angle-restricting sheet according to claim 1, comprising a protective layer provided on one face side of the optically functional layer.

8. The view angle-restricting sheet according to claim 7, wherein a refractive index ($n_4$) of the protective layer is equal to a refractive index ($n_2$) of the second light transmission section.

9. The view angle-restricting sheet according to claim 1, wherein the matrix comprises a pigment in a dispersion state.

10. The view angle-restricting sheet according to claim 1, wherein the optically functional layer comprises one or more third light transmission section(s) that is/are provided crosswise with respect to the first light transmission sections and that comprise(s) a light diffusing agent and a resin matrix.

11. The view angle-restricting sheet according to claim 1, which is provided on a front face side of a display panel of a flat panel display.

12. A flat panel display comprising the view angle-restricting sheet according to claim 11.

* * * * *